Figures 4, 5:
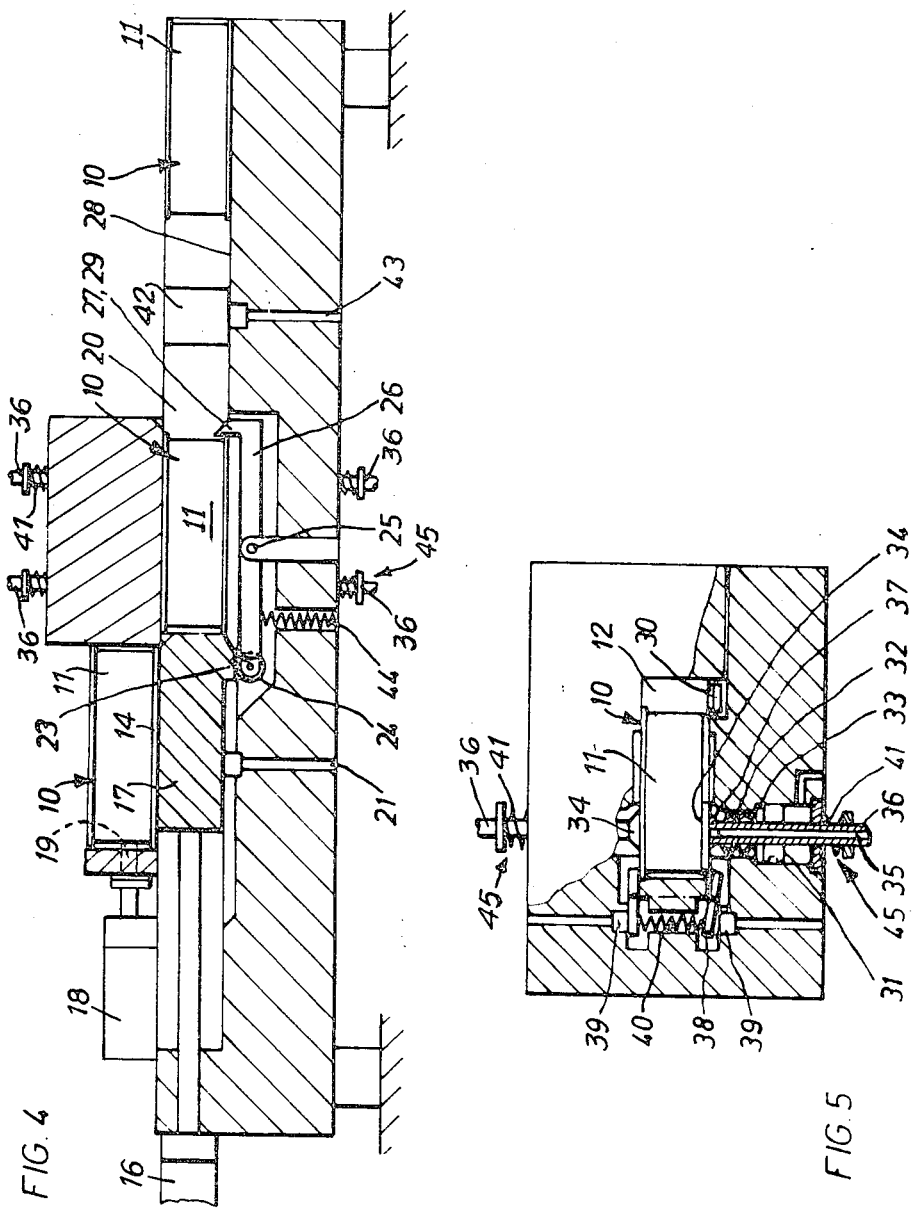

United States Patent
Thorwest et al.

[15] 3,688,567
[45] Sept. 5, 1972

[54] METHOD OF AND APPARATUS FOR CHECKING THE SEALING OF A FILM CASSETTE

[72] Inventors: Harald Thorwest; Helmut Lehmann; Helmut Lange, all of Leverkusen; Udo Schlossarek, Opladen; Jakob Siefen, Leverkusen; Hermann Mathner, Koln, all of Germany

[73] Assignee: Agfa-Gevaert Aktiengesellschaft, Leverkusen, Germany

[22] Filed: Jan. 14, 1971

[21] Appl. No.: 106,457

[30] Foreign Application Priority Data
Jan. 27, 1970 Germany..........P 20 03 409.7

[52] U.S. Cl. ....................................73/88 B, 73/95
[51] Int. Cl. .............................................G01n 3/08
[58] Field of Search ..........................73/37, 95, 88 B

[56] References Cited

UNITED STATES PATENTS

| | | | |
|---|---|---|---|
| 3,360,983 | 1/1968 | Smith | 73/37 X |
| 2,694,924 | 11/1954 | Matlock et al. | 73/37 |
| 3,402,603 | 9/1968 | Hollister et al. | 73/37 X |

*Primary Examiner*—Jerry W. Myracle
*Attorney*—Connolly and Hutz

[57] ABSTRACT

An apparatus for checking the correct sealing of film cassettes having a U-shaped cassette cover. The loaded and closed film cassettes are supplied in a defined position to the testing station and are supported therein. The checking is effected by means of tension devices which exert a certain tensile force on the arm ends of the U-shaped cassette cover, an electric or pneumatic signal being produced on release of the cassette cover.

9 Claims, 5 Drawing Figures

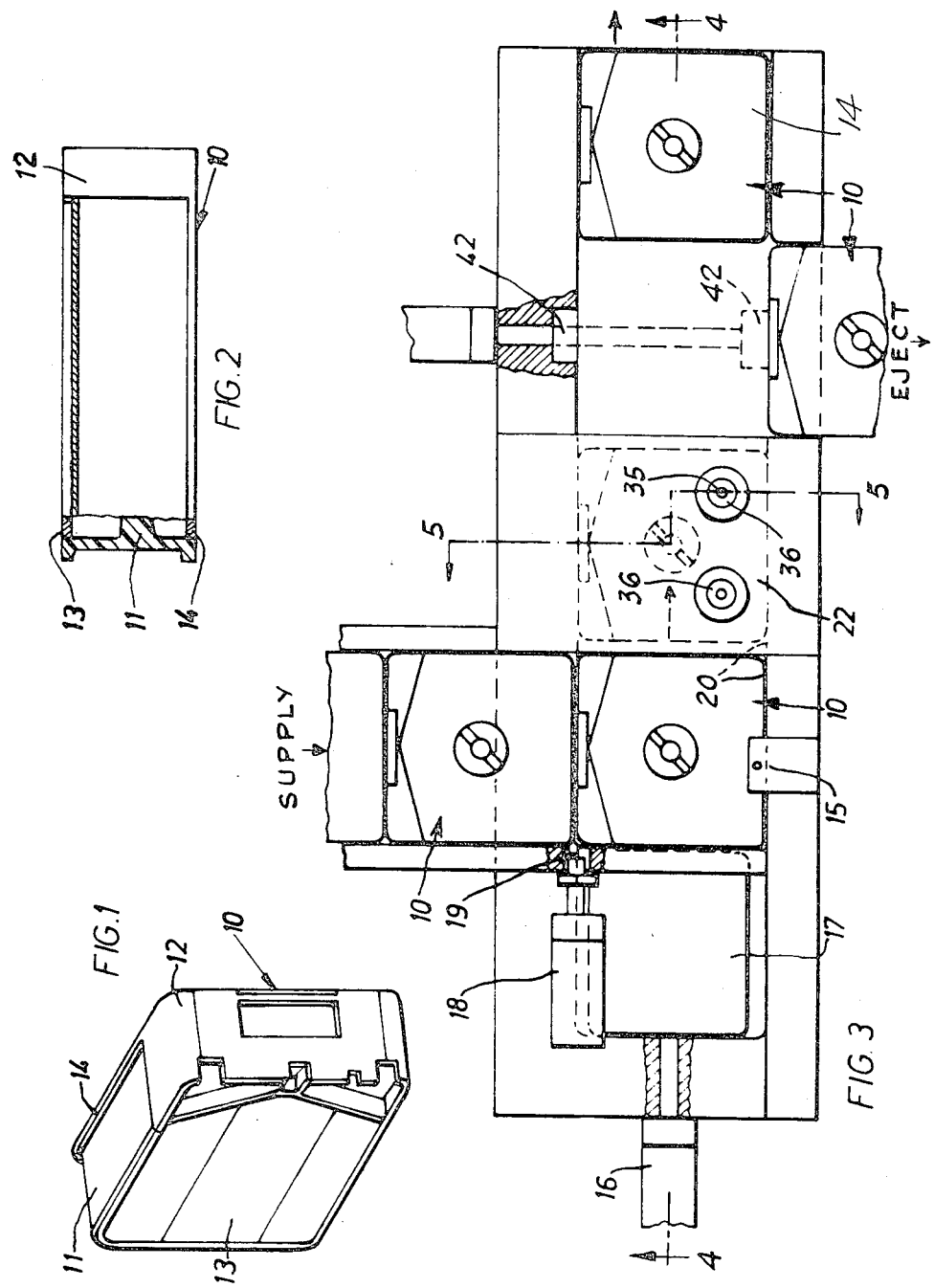

METHOD OF AND APPARATUS FOR CHECKING THE SEALING OF A FILM CASSETTE

The invention relates to an apparatus by means of which film cassettes which can be loaded into photographic cameras and which comprise a cassette body covered by a U-shaped cassette cover can be checked as to whether they are correctly sealed.

A synthetic plastics cassette loaded with film can be sealed by for example ultrasonic welding or cementing with solvents. In such cases, there is the danger that the cementing seal or union may not be effected at all positions, so that the cassette is not light-tight. An insufficient cemented connection or union is for example provided when those surfaces of the U-shaped cassette cover which are arranged in arm-like manner are only partly united at the ends of the arms or are not connected sufficiently tightly to the cassette body.

Manual checking of the seal, in which an attempt is made to lift the arm-like surfaces from the cassette body, can in practice only be carried out on one end of the arm, since the construction of the film cassette is such that the other arm-like surface is concealed in an encircling marginal recess of the cassette body.

The object of the invention is to provide an apparatus with which the checking of the seal or closure is possible in a simple and economic manner during a continuous working process.

This object is achieved according to the invention by carrying out the following processing steps by means of the checking apparatus according to the invention:

a. supplying filled and closed film cassettes in a defined position, b. supporting the cassettes in the region of the testing station, c. testing the cassettes by means of at least one tension device, which exerts a predetermined tensile force on the arm ends of the U-shaped cassette cover and attempts to lift the arm-like surfaces of the cassette cover from the cassette body, and at least one measuring position which gives an electrical or pneumatic signal when the surfaces of the cassette cover have been detached from the cassette body;

d. ejecting defective cassettes by means of an ejector device.

According to a further development of the method according to the invention, the supply or feeding of a new cassette into the testing station is initially blocked as long as the required tensile force in the tension devices is still ineffective.

The tension devices for effecting the checking of the cassettes advantageously consist of suction devices constructed in the form of bellows which are attached by suction to the arm ends of the U-shaped cassette cover and exert a tensile force on the said ends. The tensile force depends on the value to which the vacuum has been set in the suction devices.

The complete arrangement for carrying out the checking of cassettes is preferably constructed as a conveyor line assembly. First of all, the cassettes loaded with film and closed are supplied by way of the conveyor belt in a definite position to the testing apparatus. A thrust piston then moves the cassette to the testing station. After the cassette is arrested in the holding means provided for it, the suction devices are positioned on the two arm ends of the cassette cover and a predetermined tensile force is exerted on the arm ends by evacuating the bellows. If one end of an arm becomes detached, a switch contact is operated by the lifted end and this produces a control pulse by which, in the next checking test, the defective cassette is ejected by an ejector device.

The invention is further described below with reference to the drawings, wherein:

FIG. 1 is a perspective view of a cassette to be checked with the arrangement according to the invention, FIG. 2 is a front elevational view partially broken away of the cassette shown in FIG. 1, FIG. 3 is a simplified top plan view, partly broken away, of one constructional example of a checking apparatus, FIG. 4 is a cross-sectional front elevational view taken through FIG. 3 along line 4—4 with the thrust piston illustrated in its extreme forward position, and FIG. 5 is a cross-sectional side elevational view taken through FIG. 3 along line 5—5.

FIG. 1 shows a closed cassette 10, consisting of a cassette body 11 and a U-shaped cassette cover 12, having the arms 13 and 14 which are connected by welding or cementing to the body 11. As can be seen in FIG. 2, the arm 13 lies flush in an encircling marginal recess of the cassette body 11, while the arm 14 overlaps the body.

FIG. 3 shows a simplified view of one constructional example of a testing apparatus. The cassettes 10 are supplied in the correct orientation to the apparatus by means of a conveyor belt (not shown). A switch contact, which is closed by the cassette 10, actuates a thrust piston 16 with a shaped pusher part 17 and another piston 18 with a wedge-shaped restraining part 19. The wedge-shaped restraining part 19 of the piston 18 pushes back the cassettes fed by the belt to such an extent that, as shown in FIG. 4, the cassette 10 lying in the region of a contact 15 can drop freely into a guide channel 20 disposed at a lower level as soon as the piston 16 has returned to the piston shown in FIG. 3. A contact or feeler 21 which is arranged in the bottom of the guide channel 20 checks the presence of the cassette 10 and at the same time causes the emmission of a control pulse by means of the shaped pusher part 17 of the piston 16 pushes the cassette into the region of a testing station 22.

A cam 23 which is provided on the shaped pusher part 17 and which is guided in a recess in the base of the guide channel 20 actuates a locking lever 26 through a roller 24. The lever 26 is mounted at a pivot point 25 at the end of the travel of the piston 16. The lug 27 is moved beyond a cassette supporting surface 28 into the cassette guide channel 20 and serves as a stop for the cassette 10 pushed forward by the piston 16. A cassette which is already checked and which is disposed in the region of the lug 27 is lifted by the latter and, after downward movement of the locking lever, once again rests on the support surface 28.

A contact 29 (not shown) is arranged on the lug 27, and this contact is closed as soon as the advanced cassette has reached the lug 27.

As will be seen from FIG. 5, the contact 29 operates a diaphragm tensioning device 30 which presses the cassette in the prescribed position against the upper surface of the guide channel 20 and clamps it. Simultaneously the contact 29 causes a pressure valve (not shown) to open, and this valve moves the piston 31, in tension device 45 on which there are fixed suction devices 32 constructed in the form of bellows, against fixed stops 33. The stops 33 are so arranged that the entire suction surfaces 34 of the suction devices 32 bear on the arm ends 13 and 14 of the U-shaped cassette cover 12.

The contact 29 also causes a valve (not shown) to admit suction air, by which the required vacuum is obtained in an internal space 37 of the suction device 32 through a bore 35 in a piston rod 36. This operation causes the suction devices 32 to contract because of the negative pressure and thereby exert a tensile force, which can be varied by altering the negative pressure, on the arm ends 13 and 14 in the region of the suction surface 34.

If the cassette 10 to be tested is only partially or not sufficiently firmly united to the cassette body 11, for example, on one side of the arm end 13, the arm end is lifted by suction from the cassette body 11 and moved against a contact lever 38. The lever 38 actuates a contact or feeler 39, by which a pulse is stored. The contact levers are biased into their end positions by compression springs 40.

The checking operation in the region of the testing station 22 is completed when the negative pressure necessary for the predetermined tensile force is maintained for a short time and is then switched off. This is made possible by time switch elements (not shown), which switch off the compressed air simultaneously with the negative pressure. By way of example, the lifting or retracting movement of the suction devices 32 can then be effected by compression springs 41. If for any reason the negative pressure for the necessary tensile force is not reached, the testing operation is not terminated and the feeding of a new cassette by the thrust piston 16 is stopped. It is only by reaching the required negative pressure, which can be checked for example by means of a diaphragm switch, that the locking device is moved into the inoperative position and the testing operation for the next cassette is initiated, i.e. the diaphragm tensioning device 30 is released and the thrust piston 16 with the shaped pusher part 17 is moved into the other end position shown in FIG. 3. The locking lever 26 is likewise moved by the compression spring 44 so that its lug 27 is removed from the range of the guide channel 20. The tested cassette is pushed by the next cassette to be tested and by means of the piston 16 out of the range of the testing station 22 and is then disposed in front of an ejector 42.

If the checking of the cassette 10 has shown defects, the cassette checked by a feeler 43 is pushed out of the path of travel of the correct cassettes by the ejector 42, which can for example be a piston. Operation of the ejector 42 is actuated through the pulse stored by the contact 39.

We claim:

1. A method of checking the closure or seal of film cassettes which comprise a cassette body covered by a U-shaped cassette cover, the said body being cemented or welded to the arm ends of the cassette body characterized by the following processing steps:

a. supplying loaded, closed film cassettes in a defined position;

b. supporting the cassettes in the region of the testing station;

c. testing of the cassettes by means of exerting a predetermined tensile force on the arm ends of the U-shaped cassette cover to attempt to lift the arm ends of the cassette cover from the cassette body and providing an electrical or pneumatic signal in response to movement of the arm ends away from the cassette cover when the arm ends have become detached from the cassette body; and d. ejecting defective cassettes by means of an ejector.

2. A method according to claim 1, characterized in that the supplying of a new cassette to the testing station is blocked as long as the required tensile force in the tension devices to lift the the arm ends is still not effective.

3. A method for checking the light tightness of a film cassette having a casing with sealed arms comprising the steps of determining a preselected tensile force which said sealed arms should resist if their seal is light tight, supplying said cassettes to a testing station for subjecting said arm to said preselected tension force, applying said tension force to said arm, generating a signal in response to movement of said arm if said tension force breaks said arm free of said casing as an indication that said casing is not light tight, and utilizing said signal for discarding said cassettes from which said arm has been broken free.

4. A method as set forth in claim 3 wherein said cassette includes a pair of said arms on opposite sides, and said tension force is applied in opposite directions to said arms at said testing station.

5. An apparatus for checking the light tightness of film cassettes having sealed arms comprising a passageway for said cassettes, stop means in said passageway for said cassettes whereby a testing station is defined, clamping means at said testing station for firmly holding said cassettes in position for testing, a suction applying device at said testing station for applying a predetermined tension pull to said arm, said suction device including a bellows disposed adjacent said arm in the wall of said passageway, reciprocating means connected to said suction device moving said bellows into contact with said arm, and a suction tube connected with said bellows for creating a negative pressure in said bellows and thus applying a tension pull on said arm.

6. An apparatus as set forth in claim 5 wherein said film cassettes have arms on opposite sides and said apparatus has a pair of said tension applying devices disposed on opposite sides of said passageway.

7. An apparatus as set forth in claim 5 wherein motion sensors are disposed in said passageway adjacent said arm and said motion sensors having means for generating a signal when said motion sensors are moved in response to an arm broken free of said cassettes by said tension applying device.

8. An apparatus as set forth in claim 5 wherein a return spring is connected to said tension applying device for retracting it out of contact with said arm of said film cassette.

9. An apparatus as set forth in claim 5 wherein said reciprocating means is a pneumatic cylinder and piston and said suction tube extends through said piston.

* * * * *